United States Patent [19]
Belfort et al.

[11] Patent Number: 5,204,002
[45] Date of Patent: Apr. 20, 1993

[54] CURVED CHANNEL MEMBRANE FILTRATION

[75] Inventors: Georges Belfort, Slingerlands, N.Y.; Mary E. Brewster, Longmont, Colo.; Kun-Yong Chung, Troy, N.Y.

[73] Assignee: Rensselaer Polytechnic Institute, Troy, N.Y.

[21] Appl. No.: 903,990

[22] Filed: Jun. 24, 1992

[51] Int. Cl.$^5$ .................... B01D 61/18; B01D 63/10
[52] U.S. Cl. .................. 210/634; 210/321.74; 210/321.83
[58] Field of Search ............ 210/634, 637, 644, 649, 210/321.6, 321.72, 321.74, 321.83, 321.78, 321.87

[56] References Cited

PUBLICATIONS

PCT/CH90/00022, Swiss PCT Application.
Brochure-Romembra Toray Reverse Osmosis Elements.
G. Belfort, "Fluid Mechanics in Membrane Filtration: Recent Developments", *J. Memb. Sc.*, 40, 123-147 (1989).
S. Bland, et al., "Transitions Toward Turbulence in a Curved Channel", *Phys. Fluids*, A3(1), Jan. 1991.
P. Ligrani, et al., "Flow Visualization of Dean Vortices in a Curved Channel with 40 to 1 Aspect Ratio", *Phys. Fluids*, 31(12), Dec. 1988.

*Primary Examiner*—Frank Sever
*Attorney, Agent, or Firm*—Notaro & Michalos

[57] ABSTRACT

A filtration apparatus and method utilizes inner and outer walls of porous material which curve around an axis of curvature to define a narrow channel having a spiral shape. The curvature of the spiral and/or the gap width of the channel is selected to create and maintain Dean vortices within the flow of fluid along the channel to maintain good flux of filtrate through the porous walls.

15 Claims, 16 Drawing Sheets

CURVED CHANNEL MEMBRANE FILTRATION

FIELD AND BACKGROUND OF THE INVENTION

The present invention relates in general to filtration modules, and in particular to a new and useful method and apparatus which utilizes a curved fluid channel constructed to maximize the formation of vortices at the solution-membrane interface, for improving the filtration effect.

Currently, most modular designs for pressure-driven membrane processes, such as reverse osmosis, ultrafiltration and microfiltration are based on maximizing membrane area per unit volume and on the handling convenience of the module. Except for rotating filter designs, no module is currently designed specifically for the purpose of minimizing concentration polarization (CP) and fouling of the membrane. Many methods exist for reducing CP and fouling, including chemical modification of the membrane surface and physical methods such as scouring. Hydrodynamic methods are also known which rely on eddies during turbulent flow, or induced flow instabilities. Such instabilities can be created by introducing inserts into the flow path. Unstable flow across membranes have also been utilized to reduce solute build-up at the solution-membrane interface, by one of the co-inventors of the present application. See Belfort, G., "Fluid mechanics in membrane filtration: recent developments", *J. Membrane Sci.*, 40, 123-147 (1989).

Different types of instabilities have been used including vortices and instabilities resulting from rough membrane surfaces, flow pulsations and oscillating membrane surfaces. One of the most successful depolarizing methods has used Taylor vortices established in a rotating annular filter module. The main limitations of this design are the difficultly in scaling-up membrane area and high energy consumption. Vortices have also been produced in membrane-lined channels by frequently reversing turbulent flow (at 8 Hz) in a corrugated channel. See, Stairmand, J. W. and Bellhouse, B. J., "Mass transfer in a pulsating turbulent flow with deposition into furrowed walls," *Int. Heat Mass Transfer*, 27, 1405 (1985). This has also been done by forcing the fluid to flow around in a spiral half-cylinder channel over a flat membrane. See PCT patent application WO 90/09229 of Aug. 23, 1990 to Winzeler. Both of these approaches show increased performance in the presence of vortices, but each has experienced some difficulties including scale-up and sealing problems.

The use of spacers in a spiral wound unit to induce mixing has been widely recommended. Unfortunately, at low axial Reynolds numbers typically used in Poiseuille flow for most spiral wound units, this approach has been largely ineffective. See the spiral flow filters of Toray Industries, Inc., disclosed, for example, in their brochure entitled Romembra Toray Reverse Osmosis Elements.

SUMMARY OF THE INVENTION

The present invention is an apparatus and method of establishing vortices, in particular, Dean vortices, resulting from the onset of unstable flow in a curved and unobstructed slit channel. Such Dean vortex flow not only has similar advantages as Taylor vortex and oscillating flows but also is amenable to scale-up. In addition, the invention does not consume unreasonable amounts of energy not have sealing difficulties.

The controlled creation and maintenance of Dean vortex instabilities for depolarizing solute build-up at membrane-solution interfaces according to the present invention, is achieved by providing a curved channel which in narrow in a radial direction to the axis of curvature, but broad parallel to the axis. The channel is also long along the curve, and the curvature and/or gap width of the channel follows a mathematical requirement. According to the invention, a new low polarizing and low fouling membrane module is provided.

Accordingly, an object of the present invention is to provide a filtration apparatus for separating at least one substance of a fluid, from another substance of the fluid, comprising: an inner wall of material that is porous to the one substance and which is curved around an axis of curvature; an outer wall of material that is porous to the one substance and which is curved around an axis of curvature, the outer wall being spaced outwardly of the inner wall by a gap defining a curved channel having an inlet end for receiving a flow of the fluid and an outlet end for discharging the flow of fluid, the gap of the channel being narrow compared to a width of the channel along the axis; and the channel having a curvature and gap which is defined by the curvature of said inner and outer walls and which is selected to create and maintain Dean vortices in the flow of the fluid along the channel.

A further object of the present invention is to provide a method of separating one substance from another in a flowing fluid, which comprises passing the fluid through a narrow curved channel between porous walls for the substance, the curvature and/or gap width being selected to create and maintain Dean vortices in the flow.

A further object of the invention is to provide a filtration apparatus comprising a curved fluid channel which is narrow in a radial direction to the axis of curvature whereby Dean vortices are induced in the fluid flowing in the curved channel. The fluid flow continuing into a region of flow wherein the Dean vortices are no longer established because of a change of flow channel geometry, but Dean vortices previously established in the flowing fluid are not fully dissipated in a region where the fluid contacts a porous or semi-permeable membrane. Suitable flow channel geometry changes may result from a change in the axis of curvature, including an axis of curvature approaching infinity, i.e., a planar surface, or a change in the flow channel gap in the radial direction such as enlarging the gap, or other change in fluid flow geometry whereby the Dean vortices are no longer established.

A further object of the invention is to provide a method of separating at least one substance from another in a flowing fluid which comprises passing the fluid through a narrow curved channel, the curvature and/or gap width being selected to create Dean vortices in the flowing fluid. The fluid containing the Dean vortices then flows in a region of the flow channel wherein geometry of the flow channel is such that Dean vortices are not established, but previously established vortices have not dissipated and the flow channel surface is permeable to at least one substance within the fluid.

A still further object of the present invention is to provide a mathematical relationship for the curvature of the channel, which is a function of wall material permeability, fluid viscosity and flow, and for some embodiments of the invention, gap width in the channel.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

The present invention is based on the inventor's recognition that a numerically dictated control of curvature and/or gap width in a spirally wound slit channel having porous walls, can maximize flux of at least one substance from a fluid flowing in the channel, through the porous walls, by creating and maintaining Dean vortices in the channel.

Figure 1:
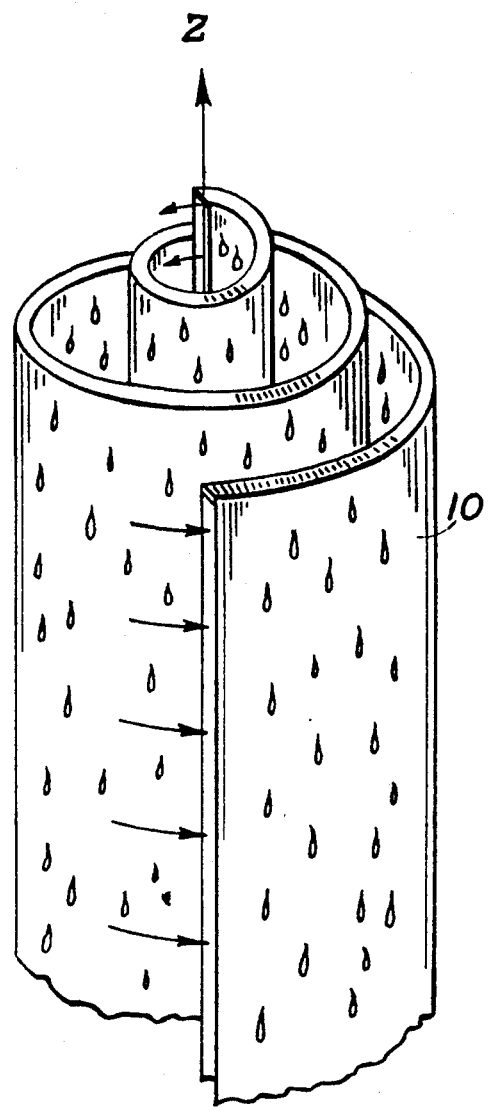
FIG. 1 is a partial schematic perspective view of a narrow gap spiral channel having porous, in particular, semi-permeable membrane walls, showing the basic principle of the present invention.
Figure 2:
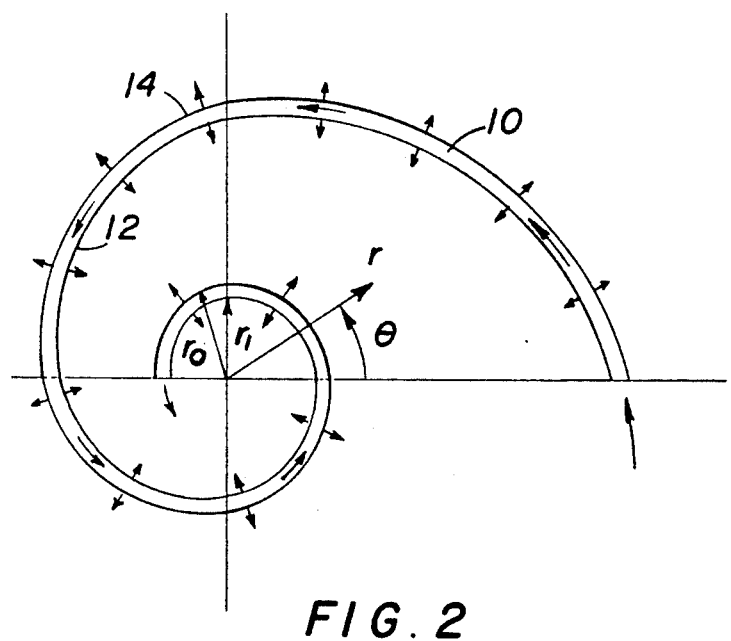
FIG. 2 is a schematic sectional view of a channel constructed in accordance with the present invention.
Figure 7:
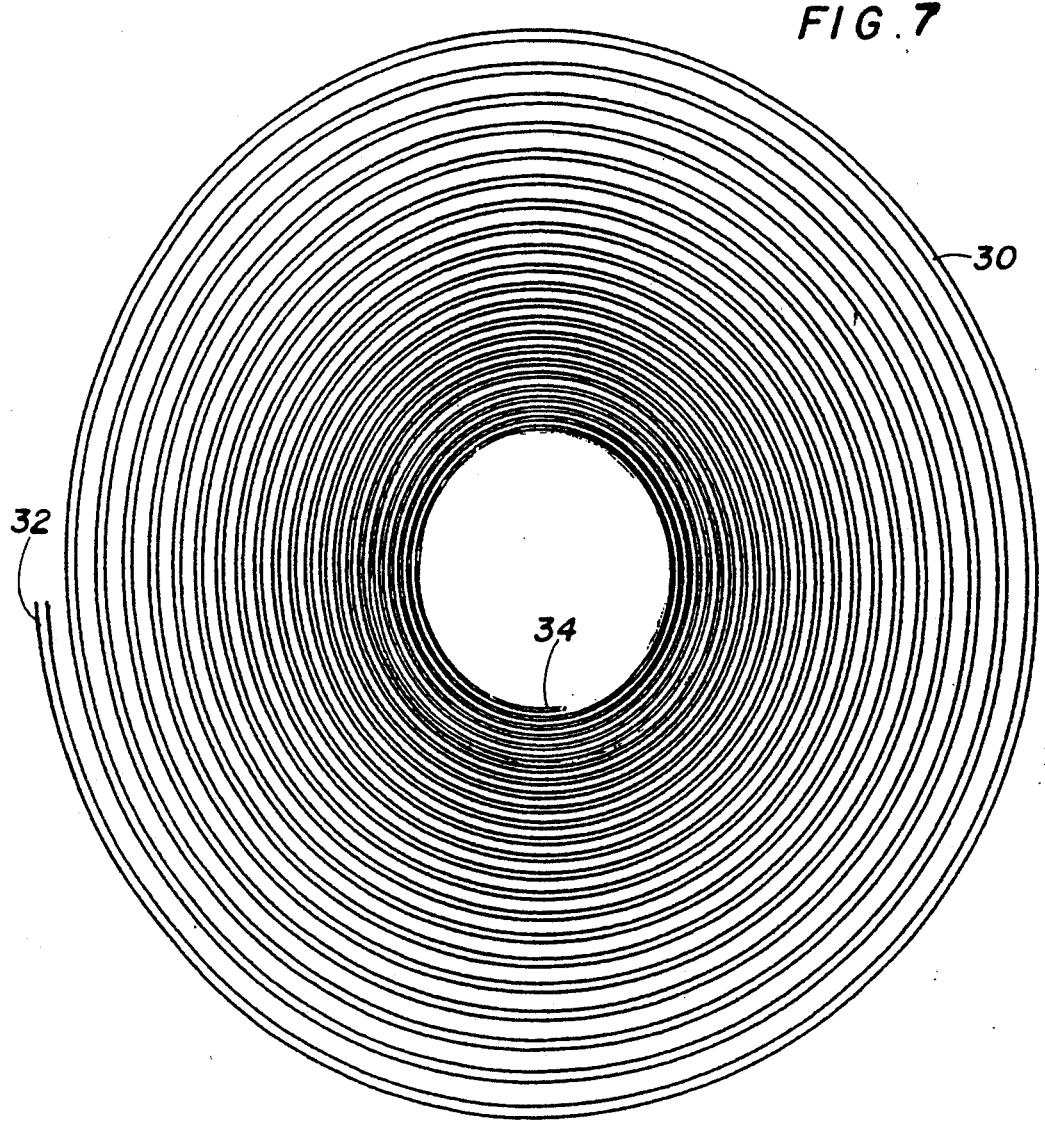
FIG. 7 is a sectional view of the channel of an embodiment of the invention utilizing a variable gap approach.

One basic approach illustrated in FIGS. 1 and 2 utilizes a constant gap curved channel while the other basic approach illustrated in FIG. 7 utilizes a variable gap channel, in particular a channel which decreases in gap width from an outer fluid inlet to the channel, to an inner outlet thereof.

Considering steady flow in a curved channel 10 as illustrated in FIGS. 1 and 2, the channel has infinite extent in the z-direction. That is, the channel is very narrow in the radial direction of curvature and very long parallel to the axis of curvature. The radius of an inner wall 12 of the channel is denoted $r_i$, while the radius of the outer wall 14 is denoted $r_o$. It is assumed that the channel gap, spacing or $r_o-r_i$ is constant in this embodiment of the invention, but the radius ratio along the channel $$\eta = \frac{r_i}{r_o} \qquad (1)$$

is allowed to vary. The reference length scale is chosen such that $$r_o - r_i = 2 \qquad (2)$$

For convenience the following listing defines each term used in the equations:
For convenience the following listing defines each term used in the equation:
å: spanwise wavenumber of vortices, nondimensional
$a_m$: spanwise wavenumber corresponding to $Re_m$
B: mean streamwise velocity factor
CCPF: curved channel Poiseuille flow
d∗: dimensional channel spacing
K: constant in Darcy's Law
p: dimensional pressure
Pext: exterior pressure
P: CCPF pressure
$r_i$: inner radius
$r_o$: outer radius
$r_c$: channel centerline radius
$Re_{ref}$: wall Reynolds number
$Re_c$: critical Reynolds number
$Re_m$: minimum Reynolds number
$Re_c$: interpolated critical Reynolds number
$v_{ref}$: reference velocity
$v_\theta$: streamwise velocity
$v_r$: radial velocity
V: CCPF streamwise velocity profile
α: wall flux at $r_i$, nondimensional
β: wall flux at $r_o$, nondimensional
η: radius velocity
θ: polar angle
$\bar{\theta}$: scaled polar angle
u: kinematic viscosity
σ: growth rate for small amplitude disturbances Next, suppose that the flow is "slowly-varying" in the polar angle θ around the axis of curvature at z. That is, there is a smaller parameter ε such that the velocity components, pressure gradient and other parameters depend on $$\bar{\theta} = \epsilon \theta \qquad (3)$$

One cause of this azimuthal variation is the nonconstant radius ratio $$\eta = \eta(\widetilde{\theta}) \tag{4}$$

Further, specify radial velocity flux through the walls as $$v_r = -\alpha(\widetilde{\theta})v_{ref} \text{ at } r = r_i, \tag{5a}$$

$$v_r = \beta(\widetilde{\theta})v_{ref} \text{ at } r = r_o. \tag{5b}$$

The reference velocity $v_{ref}$ is chosen such that $\alpha$ and $\beta$ are O(1) (the expression "O(X)" is generally read to mean "on the order of X" where x is a value) quantities.

Now carry out an asymptotic analysis of Navier-Stokes equations in the limit of small $\epsilon$. At leading order in the momentum equations $$\epsilon \frac{1}{r} \frac{\partial p}{\partial \theta} = \frac{2\nu}{d^*} \left( \frac{\partial^2 v_\theta}{\partial r} - \frac{v_\theta}{r^2} \right) \tag{6}$$

and $$\frac{\partial p}{\partial r} = \frac{v_\theta^2}{r}. \tag{7}$$

Here $d^*$ is the dimensional channel spacing and $-\nu$ is the kinematic viscosity. Equation (6) suggests that the pressure must be $O(\underline{\epsilon}^{-1}\nu)$, but the leading term in the pressure must be independent of r so that the terms in equation (7) will balance. Thus, let $$p(r,\widetilde{\theta}) \sim \frac{1}{\epsilon} p^0(\widetilde{\theta}) + p^1(r,\widetilde{\theta}). \tag{8}$$

Then equations (6,7) become $$\frac{1}{r} \frac{\partial p^0}{\partial \widetilde{\theta}} = \frac{2\nu}{d^*} \left( \frac{\partial^2 v_\theta}{\partial r^2} + \frac{1}{r} \frac{\partial v_\theta}{\partial r} - \frac{v_\theta}{r^2} \right) \tag{9}$$

and $$\frac{v_\theta^2}{r} = \frac{\partial p^1}{\partial r}. \tag{10}$$

The no-slip boundary conditions are $$v_\theta = 0 \text{ at } r = r_i \text{ and } r = r_o. \tag{11}$$

Equation (9) is satisfied provided $$v_\theta = v_{ref} B(\widetilde{\theta}) V(r,\eta) \tag{12}$$

and $$\frac{\partial p^0}{\partial \widetilde{\theta}} = \frac{v_{ref}^2}{Re_{ref}} B(\widetilde{\theta}) H(\eta)$$

where (V,H) is the solution of $$\frac{1}{r} H = \frac{\partial^2 V}{\partial r^2} + \frac{1}{r} \frac{\partial V}{\partial r} - \frac{V}{r^2}, \tag{13}$$

$$V(r_i) = V(r_o) = 0,$$

$$\int_{r_i}^{r_o} V(r) dr = 2.$$

The last equation is a normalization condition. Also, $$Re_{ref} = \frac{v_{ref} d^*}{2\nu} \tag{14}$$

In particular, $$V = A \left( r\ln r + Cr + \frac{E}{r} \right), \tag{15}$$

$$H = 2A$$

where $$A = \frac{-2}{r_c + E\ln\eta}, \quad E = \frac{-r_i^2 r_o^2}{r_o^2 - r_i^2} \ln\eta, \tag{16}$$

$$C = \frac{r_i^2 \ln r_i - r_o^2 \ln r_o}{r_o^2 - r_i^2}, \quad r_c = \frac{r_i + r_o}{2} = \frac{1 + \eta}{1 - \eta},$$

$$r_i = \frac{2\eta}{1 - \eta}, \quad r_o = \frac{2}{1 - \eta}.$$

The multiplying factor B gives the mean streamwise flux, which will be determined from the continuity equation. Assuming that the radial velocity is of the same order of magnitude as the wall flux, let $$v_r = v_{ref} u(r,\widetilde{\theta}). \tag{17}$$

From the continuity equation $$\frac{\partial}{\partial r}(rv_r) + \epsilon \frac{\partial v_\theta}{\partial \widetilde{\theta}} = 0$$

and the asymptotic formula (12) for $v_\underline{\epsilon}-$, one obtains $$\frac{\partial}{\partial r}(ru) = -\epsilon \frac{\partial}{\partial \widetilde{\theta}} \left[ A(\eta) B(\widetilde{\theta}) \left( r\ln r + Cr + \frac{E}{r} \right) \right] \tag{18}$$

Integration of equation (18) gives $$u \sim \frac{k(\widetilde{\theta})}{r} - \tag{19}$$

$$\frac{\epsilon}{r} \frac{\partial}{\partial \widetilde{\theta}} \left[ A(\eta) B(\widetilde{\theta}) \left( \frac{1}{2} r^2 \ln r + \frac{2C - 1}{4} r^2 + E \ln r \right) \right]$$

where k is chosen to satisfy the boundary condition (5a), for example. The other boundary condition (5b) will be satisfied provided the change in streamwise flux balances the flux through the walls; that is, $$\epsilon \frac{dB}{d\widetilde{\theta}} = -\frac{1}{2}[\alpha r_i + \beta r_o] = -\frac{\alpha \eta + \beta}{1 - \eta} \tag{20}$$

Considering two types of wall flux conditions, the first condition, assume that the azimuthal pressure drop is small compared to the transmembrane pressure drop (across the membrane). Then it is reasonable to suppose that the wall flux is constant with $\underline{\widetilde{\theta}}$—. In particular, let $$\alpha = \beta = 1. \qquad (21)$$

There is also a more general condition, where the wall flux obeys Darcy's law. Thus the wall flux is proportional to the transmembrane pressure drop.

$$\beta = \alpha = \frac{K}{v_{ref}}(p^0 - p_{ext}) \qquad (22)$$

where K is the permeability coefficient and $p_{ext}$ is the external pressure. Then differentiate equation (22) with respect to $\overline{\underline{\theta}}$ and substitute from equation (12) to obtain $$\frac{\partial \beta}{\partial \overline{\theta}} = \frac{K}{v_{ref}} \frac{\partial p^0}{\partial \overline{\theta}} = \frac{2Kv}{d^*} B(\overline{\theta})H(\eta). \qquad (23)$$

To explain how an unstable (vortex) condition can be created and maintained, it is necessary to make precise the condition where the stabilizing effects of wall flux balance the destabilizing effects of increasing curvature. The critical Reynolds number is the largest Reynolds number below which the curved-channel Poiseuille flow or CCPF is stable, while for greater Reynolds number, other flow patterns, such as Dean vortices, are stable. See, Drazin, P. G. and Reid, W. H., *Hydrodynamic Stability*, Cambridge University Press, Cambridge (1988), for example. The critical Reynolds number can be described as a function of the radius ratio $\underline{\eta}$:

$$Re_c = g(\eta) \qquad (24)$$

An azimuthally-varying Reynolds number is defined as $$Re(\overline{\theta}) = \frac{V_\theta d^*}{2v} = B(\overline{\theta})Re_{ref} \qquad (25)$$

where $V = v_{ref}B(\widetilde{\theta})$ is the mean azimuthal velocity. It is now necessary to determine $\underline{\eta}$ $(\overline{\underline{\theta}})$ such that a slowly-varying steady flow exists, satisfying the mass-balance equation (20) and with $$Re(\overline{\theta}) = Re_c(\eta). \qquad (26)$$

Substituting from equations (24, 25) and differentiating equation (26) with respect to $\overline{\underline{\theta}}$ gives $$Re_{ref}\frac{dB}{d\overline{\theta}} = \frac{dg}{d\eta} \frac{d\eta}{d\overline{\theta}}. \qquad (27)$$

Examining equation (20), it is seen that a natural choice for the small parameter $\underline{\varepsilon}$ is $Re_{ref}$, defined in (14). Assuming $\underline{\varepsilon}$ is small is equivalent to supposing that wall flux is small compared the streamwise flux. Combining equations (20) and (27) and solving $d\eta/d\overline{\theta}$ gives the neutral stability criterion $$\frac{d\eta}{d\overline{\theta}} = \frac{-(\alpha \eta + \beta)}{(1 - \eta)\frac{dg}{d\eta}}, \qquad (28)$$

where $dg/d\eta$ is obtained for two cases below. This is a nonlinear ordinary differential equation which can in principle be solved for $\underline{\eta}$.

Figure 5:
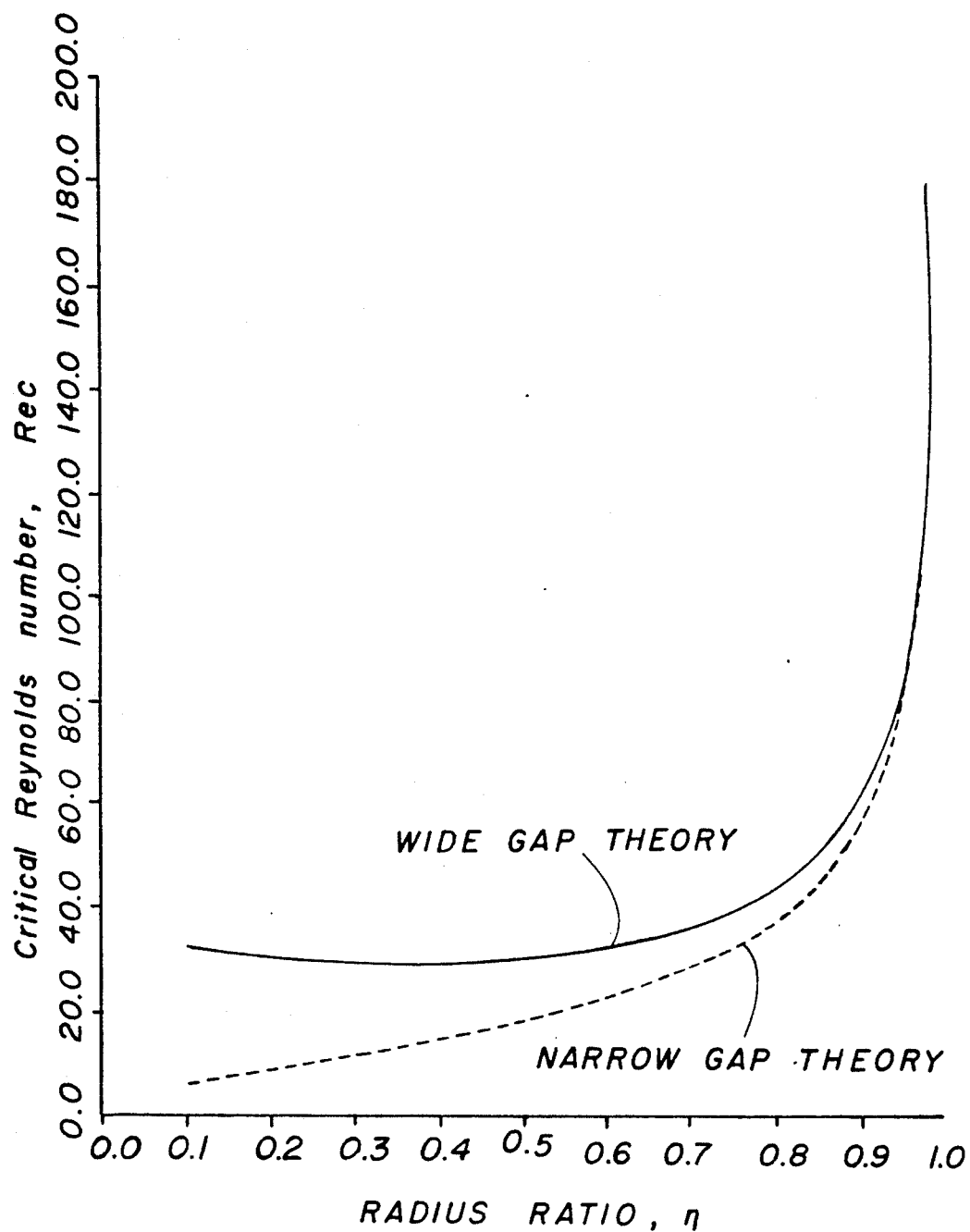
FIG. 5 is a graph plotting critical Reynolds number ($Re_c$) as a function of radius ratio for the inner and outer walls of the channel.

From a narrow gap theory, an exact solution of the neutral stability criterion can be found. The critical Reynolds number in narrow gap theory is given by $$g(\eta) = \frac{\kappa}{2} \sqrt{\frac{\eta}{1 - \eta}}, \qquad (29)$$

where $\underline{\kappa}$ 35.94. See, Reid, W. H. (1958) *Proc. Roy. Soc.* A 244, 186-198. The narrow gap approximation to the critical Reynolds number is shown by the dashed line in FIG. 5. Differentiation of equation (29) gives $$\frac{dg}{d\eta} = \frac{\kappa}{4} \eta^{-\frac{1}{2}}(1 - \eta)^{-3/2} \qquad (30)$$

If we assume constant wall flux, that is, equation (21) holds, then the neutral stability criterion becomes $$\frac{d\eta}{d\overline{\theta}} = -\frac{4(1 + \eta)\eta^{\frac{1}{2}}(1 - \eta)^{\frac{1}{2}}}{\kappa} \qquad (31)$$

This equation is separable and may be solved for $\underline{\eta}$ as a function of $\overline{\underline{\theta}}$. We obtain where $$\eta = \frac{1 + \cos\phi}{3 - \cos\phi}$$

$$\phi = \frac{4\sqrt{2}}{\kappa} \overline{\theta}.$$

Figure 6:
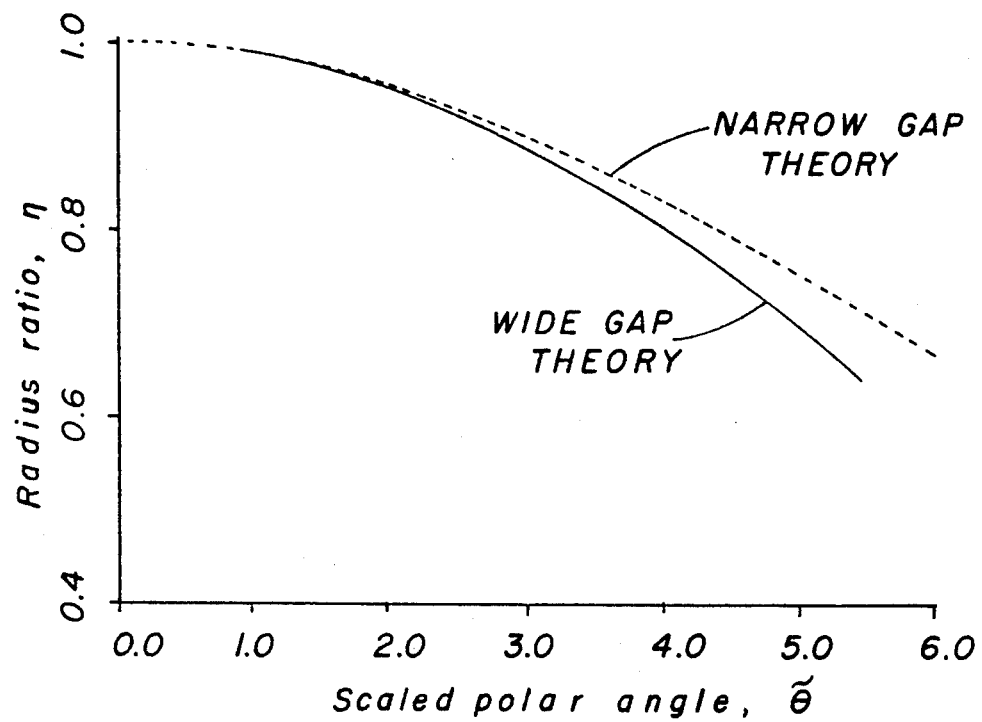
FIG. 6 is a graph plotting radius ratio as a function of scaled polar angle around the axis of curvature of the channel.

An arbitrary phase angle has been chosen so that $\underline{\eta} \to 1$ as $\overline{\underline{\theta}} \to 0$. A plot of this solution is shown in FIG. 6 by the dashed line.

To study wide gap theory and numerical determination or $Re_c$ the hydrodynamic stability of the main flow without wall flux in a wide gap was first considered. See the approach disclosed in Finlay, W. H., Keller, J. B. and Ferziger, J. H., TF-30, Dept. of Mech. Eng., Stanford University, Calif. (1987). Small amplitude axisymmetric disturbance of CCPF are introduced. The total flow is $$v_r = au(r)e^{\sigma \tau}\cos az$$

$$v_\theta = v(r)e^{\sigma \tau}\cos az + V(r)$$

$$v_z = w(r)e^{\sigma \tau}\sin az$$

$$p = p(r)e^{\sigma \tau}\cos az + P(\sigma, \theta) \qquad (32)$$

where V, P are the velocity and pressure in CCPF. The formula for V is given in equation (15). We now substitute equations (29) into the Navier-Stokes equations, and assume small disturbances so that we can linearize the equation by dropping all terms higher than first order in u, v, w, and p. Moreover, the onset of instability will be a stationary secondary flow. It appears reasonable to set $+\underline{a}=0$. With these assumptions, we get $$\frac{d^4u}{dr^4} = -u\left(-\frac{3}{r^4} + \frac{2a^2}{r^2} + a^4\right) - \frac{du}{dr}\left(\frac{3}{r^3} - \frac{2a^2}{r}\right) + \qquad (33)$$

$$\frac{d^2u}{dr^2}\left(\frac{3}{r^2} + 2a^2\right) - \frac{2}{r}\frac{d^3u}{dr^3} + \frac{2VRea}{r}v$$

-continued $$\frac{d^2v}{dr^2} = aReu\left(\frac{dV}{dr} + \frac{V}{r}\right) + v\left(\frac{1}{r^2} + a^2\right) - \frac{1}{r}\frac{dv}{dr} \quad (34)$$

Since all perturbations must vanish at the boundary walls, it follows that $$u = \frac{du}{dr} = v = 0 \text{ at } r = r_1; r_o \quad (35)$$

In order to get the solution of equations (33)-(35), we used the double precision IMSL subroutine DIVPAG and DZREAL which uses Adams-Moulton integration and Muller's method for finding the root, respectively. For each wavenumber, a Reynolds number is found. The Reynolds number attains a minimum at a certain wavenumber and this minimum is the critical Reynolds number for the preassigned radius ratio.

To determine the critical Reynolds number, an iteration procedure based on a quadratic approximation was introduced. Using three values of the wavenumber and Reynolds number, $(a_1, Re_1)$, $(a_2, Re_2)$ and $(a_3, Re_3)$, which are already calculated, we express the function as follows $$Re(a) = C_1(a - a_2)^2 + C_2(a - a_2) + Re_2 \quad (36)$$

where $$C_1 = \frac{\left(\frac{Re_3 - Re_2}{a_3 - a_2}\right) - \left(\frac{Re_2 - Re_1}{a_2 - a_1}\right)}{a_2 - a_1}$$

$$C_2 = \frac{\left(\frac{a_3 - a_2}{a_2 - a_1}\right)(Re_2 - Re_1) + \left(\frac{a_2 - a_1}{a_3 - a_2}\right)(Re_2 - Re_2)}{a_3 - a_1}$$

where $(a_1 < a_2 < a_3)$

The minimum Reynolds number, $Re_m$, is the value corresponding to the wave number, $a_m$, at which the first derivative of equation (36) is zero. Hence $a_m$ may be written as $$a_m = a_2 - \frac{C_2}{2C_1}$$

The critical Reynolds number is obtained by repeating the above procedure using the lowest point among $Re_1$, $Re_2$, $Re_3$ and the present $Re_m$, and its two adjacent points. The routine is continued until the condition comparing the minimum value with that at the previous step $$\left|\frac{Re_m^{n+1} - Re_m^n}{Re_m^{n+1}}\right| < 10^{-5}$$

is satisfied.

In order to calculate the wide gap spiral configuration that maintains Dean vortices, the critical Reynolds number as a function of radius ratio is needed. To calculate the critical Reynolds number at a given spiral radius ratio, we use the double precision ESSL subroutine DCSINT, which uses cubic spline interpolation based on the calculated values shown in FIG. 5 by the solid line. Using every other calculated value of $Re_c$, the value midway between each pair is obtained by cubic spline interpolation and compared to the calculated value. The difference is then used to estimate the error. The maximum relative error is $$\left|\frac{Re_c - \overline{Re}_c}{Re_c}\right| \leq 10^{-4}$$

where $\overline{Re}_c$ is the interpolated critical Reynolds number.

For wide gap theory numerical solution of the neutral stability criterion, we solve the neutral stability condition (28) using the NAg subroutine DØ2CBF, which uses a variable-order, variable-stop Adams method. The right-hand side of equation (28) is approximated using spline interpolation as described previously. The initial condition is chosen to match the known solution for the narrow gap case at $\overline{\theta}j = \pi/4$. This is done for purpose of comparison with the narrow gap theory only. The initial condition determine the orientation of the spiral channel, not its shape. Values of the radius ratio $\eta j$ are obtained at equally spaced angles $$\overline{\theta}_j = \pi/4 + \frac{\pi}{64}j$$

for $j = 0, 1 \ldots, 96$. The solution is shown in FIG. 6 by the solid line.

There are two sources of error in the numerical solution; the discretization error of the ODE solver and the interpolation error in the evaluation of the right-hand side of the equation. We determine the order of magnitude of these errors by varying the number of points used in the spline interpolation and the tolerance parameter passed to the ODE solver. We make the tolerance parameter sufficiently small ($10^{-8}$) so that the discretization error is negligible compared to the error from interpolation, which is estimated at less than 0.1%.

Figure 4:
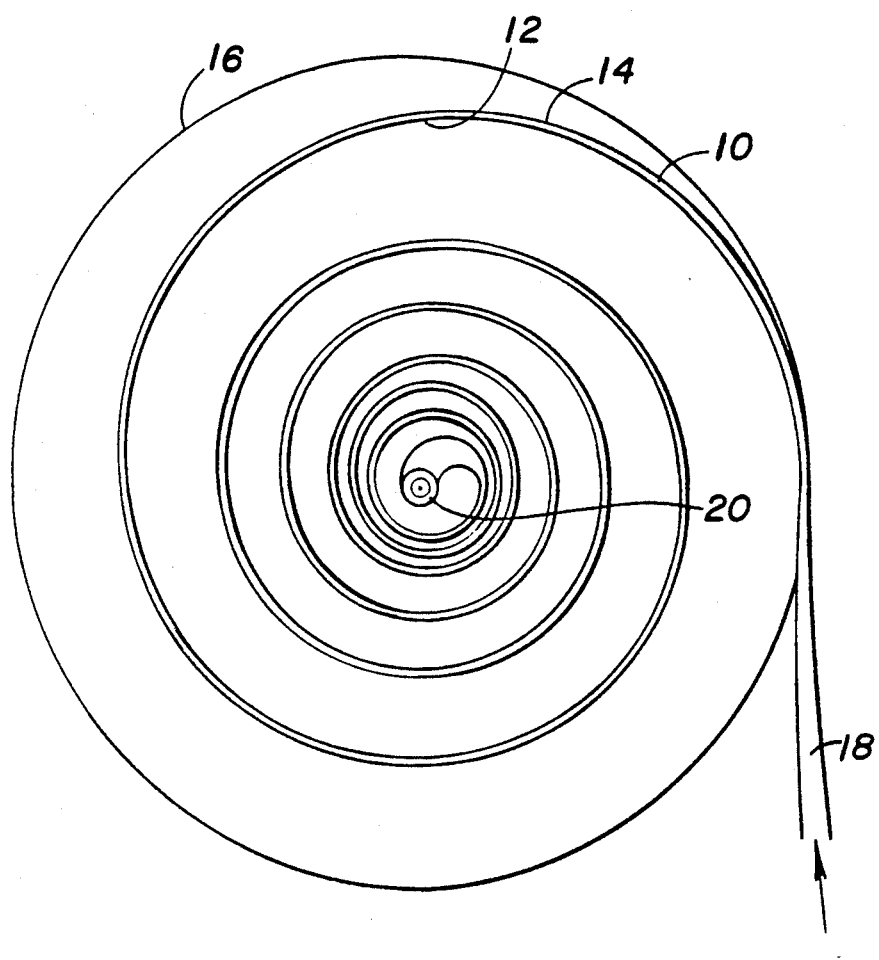
FIG. 4 is a sectional view taken along line 4—4 of FIG. 3.

From this one solution, we obtain an infinite number of spiral shapes corresponding to different values of the wall Reynolds number $Re_{ref}$. Two of these shapes are shown in FIGS. 2 and 4. In FIG. 4, $Re_{ref} = 0.25$.

Actual experiments conducted by the inventors on a channel which curves through 180°, have established the usefulness of the invention in maintaining Dean vortices when applying the algorithm of the present invention, and where $Re/Re_c = 3.83$. It is believed vortex depolarization at much higher Dean flow rates are possible for the present invention, where values of $Re/Re_c$ is tens or hundreds.

Porous membranes which can be used to practice the present invention includes high flux microfiltration membranes of polysulfone. Examples are GRM 0.2 PP and GRM 2.0 PP, Dow Danske, Nakshov, Denmark. Nominal pore size of these membranes are 0.2 and 2.0 microns respectively and the drain channel or porous support for the membrane consists of two sheets of simplex knit fabric made of polyester fiber and stiffened with epoxy coating.

Also operable in the invention disclosed and claimed are nonofiltration ultra filtrations membranes and reverse osmosis membranes.

Figure 3:
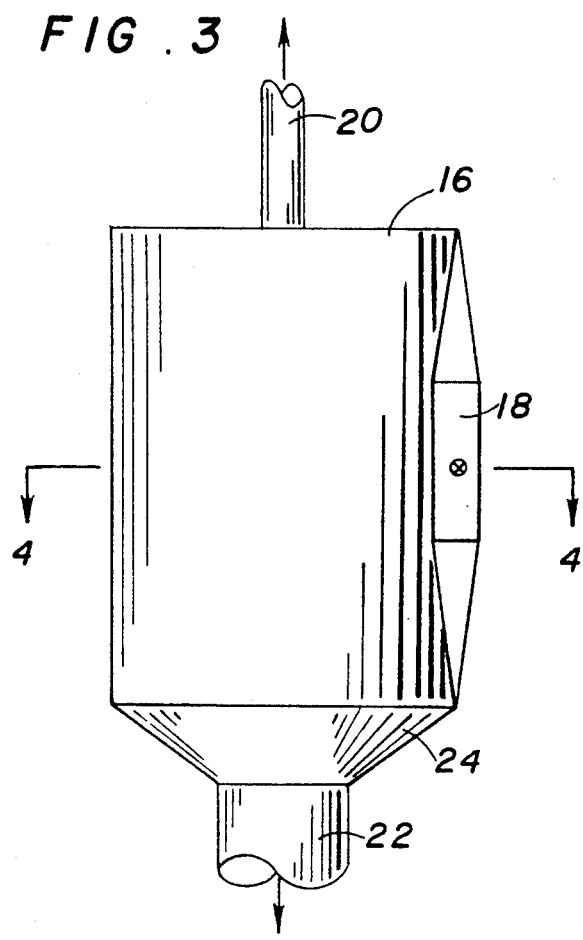
FIG. 3 is a side elevational view of a filter constructed according to the present invention.

FIGS. 3 and 4 illustrate an example of the apparatus of the invention where the same reference numerals as those used in FIGS. 1 and 2, are used to designate the same or structurally similar parts.

The filtration apparatus comprises an outer impermeable and substantially cylindrical housing 16 having appropriate inner structures to support the inner and outer walls 12, 14 of the channel 10 and to close the upper and lower ends of the axially elongated channel. Fluid is supplied at selected flow rates to an inlet 18. The change in flow rate which creates and maintains the Dean vortices depends on the curvature of the channel 10 which increases toward the center of the housing and along the spiral path of the channel. The fluid eventually reaches an outlet pipe 20 where it is discharged upwardly from the interior of the housing. Filtrate collected on the outer surfaces of the inner and outer walls 14, fall to a funnel 24 closing the bottom of the housing, and ultimately through a filtrate outlet 22.

It is advantageous to leave channel 10 open and free of baffles or other flow constricting structures since the depolarizing vortices created by the present invention alone are sufficient to maintain good flux through the membrane forming the channel walls. Also operable are spacers in the flow channel of appropriate design.

FIG. 7 illustrates another embodiment of the invention where a curved channel 30, also formed by a gap between inner and outer porous walls, has a variable gap width from an outer fluid inlet end 32 for receiving the flow of fluid to be filtered, to an inner fluid outlet end 34. Here, flow is generated at a rate to maintain the Dean vortices by gradually adjusting the flow in a channel with variable cross sectional area. As with the algorithm which dictates the increase in curvature from the outer fluid inlet to the inner fluid outlet of the curved channel in the embodiment of FIGS. 1-4, the variation in gap width must also follow an algorithm according to the present invention.

In previous examples of the invention the determined spiral shapes with constant gap, satisfied a neutral stability condition. For this family of spiral shapes the fluid flow was studied using weakly-nonlinear analysis. This study showed that the wall flux effect on the critical Dean number could be positive or negative, depending on the ratio of flux through the inner and outer walls. It was also observed that the constant gap spiral did not necessarily use the volume of the channel or filter module effectively.

A condition can be imposed on the spiral shape to ensure that the volume of the module is used effectively. Therefore, additional flexibility is needed in the design. This is to allow the gap to be an additional variable to be determined. The neutral stability condition is still imposed.

Figure 8:
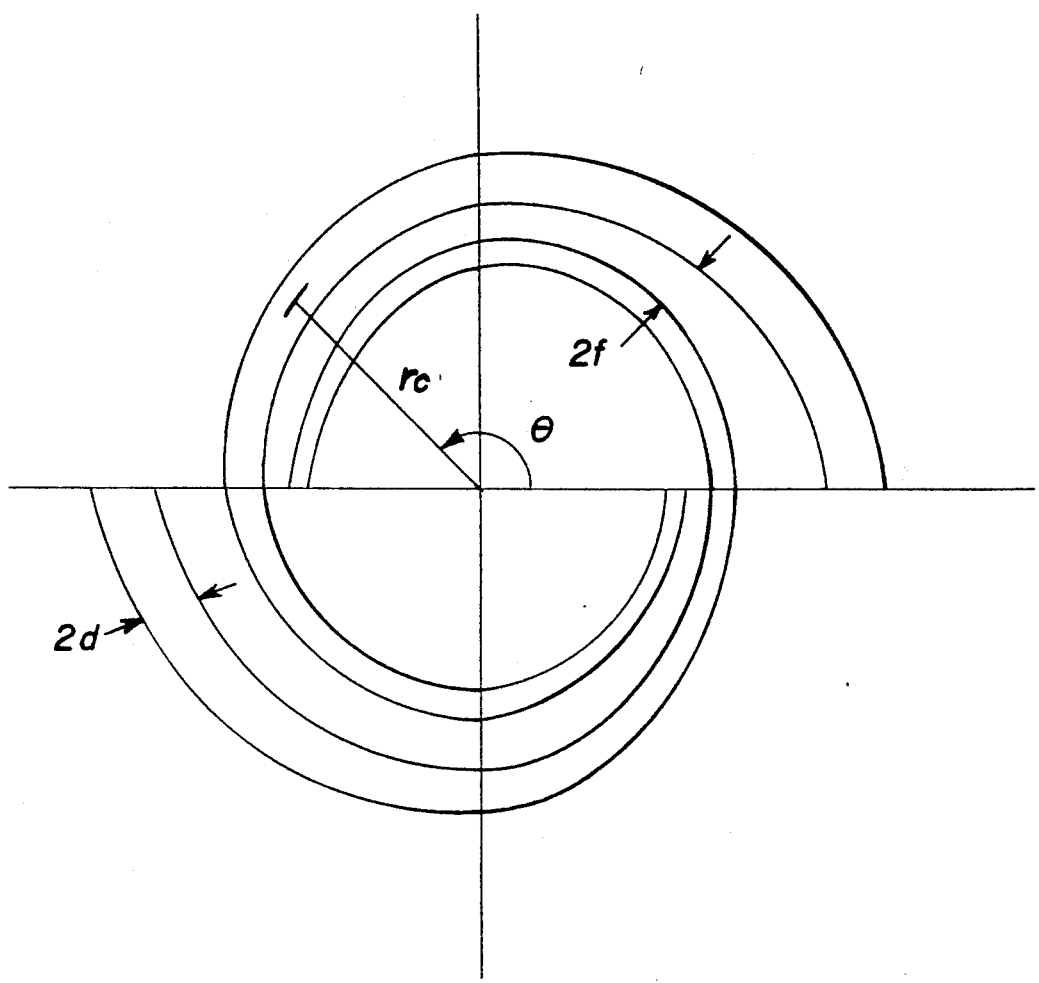
FIG. 8 is a schematic representation of a spiral configuration for a variable gap embodiment of the invention where d is the retentate gap half width, f is the permeate gap half width, $r_c$ is the centerline radius and $\theta$ is the polar angle.

We define the geometric variables that determine the shape of the spiral indicated in FIG. 8.
  $r_c$: centerline radius,
  d: retentate gap half-width,
  f: permeate gap half-width,
  l: distance along spiral from inlet,
  $\Theta$: polar angle.
The parameter m is defined as follows:
  m: number of spiral to be nested.
The flow variables are:
  V: average streamwise velocity,
  $v_{wall}$: wall suction velocity,
  p: pressure.
For simplicity, we assume that the wall suction velocity is equal on the inner and outer walls. This assumption can be easily modified. Subscripts I indicate inlet values.

The polar angle $\Theta$ will be taken as the independent variable. The inlet is taken to be at $=0$. Notice that m inlets for m nested spirals are equally spaced about a circle radius $r_d$.

We assume that the gap is narrow in relation to the radius $$d(\Theta) << r_c(\Theta).$$

We also assume the wall suction velocity is small in relation to the streamwise velocity $$v_{wall}(\Theta) << V(\Theta)$$

the equation of mass conservation is $$(dV)' = -v_{wall} r_c. \tag{37}$$

where ' indicates differentiation with respect to $\Theta$.
The Dean number De is defined as $$De^2 = \frac{(2d)^3 V^2}{\nu^2 r_c}. \tag{38}$$

We assume that the Dean number is a constant throughout the system.

The Dean number is the dimensionless group governing the onset of secondary flow. It displays a dependence on centrifugal force $V^2/r_c$ and a strong dependence on gap size d. The critical Dean number for the onset of secondary flow is approximately 36. The module should be operated with De larger than the critical value to ensure significant secondary flow. A transition to unsteady secondary flow occurs at approximately 1.2 times the critical Dean number. See W. H. Finlay, et al. AIAA Paper 87-0363, 25th AIAA Aerospace Sci. Meeting, Reno Nev., Jan. 12-15, 1987. This type of flow should provide the best mixing short of turbulent flow.

The permeate gap is determined by the spacing between adjacent spirals. In particular, let $$d(v) + 2f\left(v + \frac{\pi}{m}\right) + d\left(v + \frac{2\pi}{m}\right) = r_c(v) - r_c\left(v + \frac{2\pi}{m}\right) \tag{39}$$

An approximation to (39) is $$r_c' = \frac{m(d + f)}{\pi}.$$

We must make a choice for the relationship between the permeate and retentate gaps. One possibility is to assume that the permeate gap is proportional to the retentate gap. Thus let $$f(v) = \frac{1}{q} d(v) \text{ and } n = \frac{m(q + 1)}{q}$$

where q is a constant. Then $$r_c = nd/\pi \tag{40}$$

the fraction of volume inside one spiral is 1/n.
Some other possibilities for the permeate gap are a. f=constant,
b. f proportional to wall flux (assuming wall flux is variable). Equation (40) would be modified accordingly.

We scale the variables d, $r_c$, and V relative to their inlet values. Thus let $$B = V/V_I, \quad K = r_c/r_{cI}, \quad G = d/d_I$$

We let the inlet correspond to $=0$. Thus, $B(0)=K(0)=G(0)=1$. From equations (37), (38) and (40), we obtain $$(GB)' = -2 \frac{(V_{wall} r_{cI})}{V_I d_I} K,$$

$$K = G^3 B^2,$$

$$(K)' = \frac{ndI}{\pi r_{cI}} G$$

We define the following dimensionless groups:

$$\epsilon = \frac{v_{well}}{V_1},$$

$$\frac{\delta^2}{2} = \frac{d_I}{r_d},$$

$$\rho = \frac{\eta \delta^2}{2\pi} = \frac{\eta d_I}{\pi r_d},$$

$$\alpha = \frac{4\pi \epsilon}{\eta \delta^4} = \frac{\pi v_{well} r_d^2}{\eta V_I d_I^2}.$$

We scale the independent variable as follows:

$$\psi = \rho v.$$

Then the governing equations become $$\frac{\partial(GB)}{\partial \psi} = -2\alpha K, \quad (41)$$

$$K = G^3 B^2,$$

$$\frac{\partial K}{\partial \psi} = -G.$$

Upon expansion of the derivatives and some algebra, we find $$\frac{\partial B}{\partial \psi} = -3\alpha G^2 B^2 + \frac{1}{G^2 B}, \quad (42)$$

$$\frac{\partial G}{\partial \psi} = 2\alpha G^3 B - \frac{1}{GB^2}. \quad (43)$$

The ordinary differential equations that determine the spiral shape and mean flow values are easily solved as initial-value problems.

Figure 9:
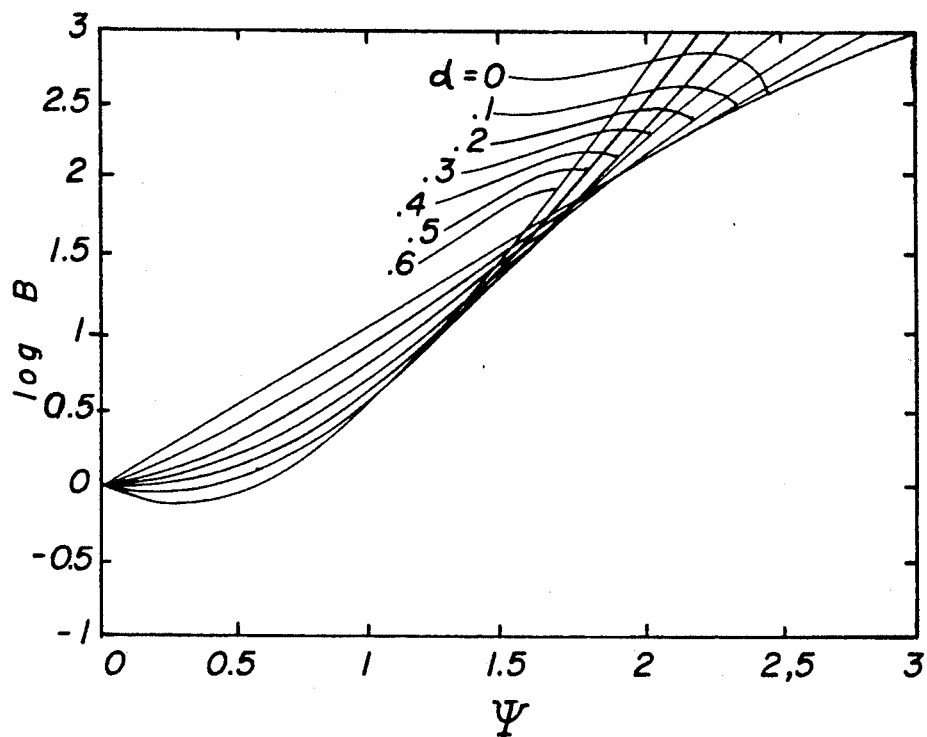
FIG. 9 is a graph plotting a streamwise velocity scalar value against polar angle, $\Psi$.
Figure 10:
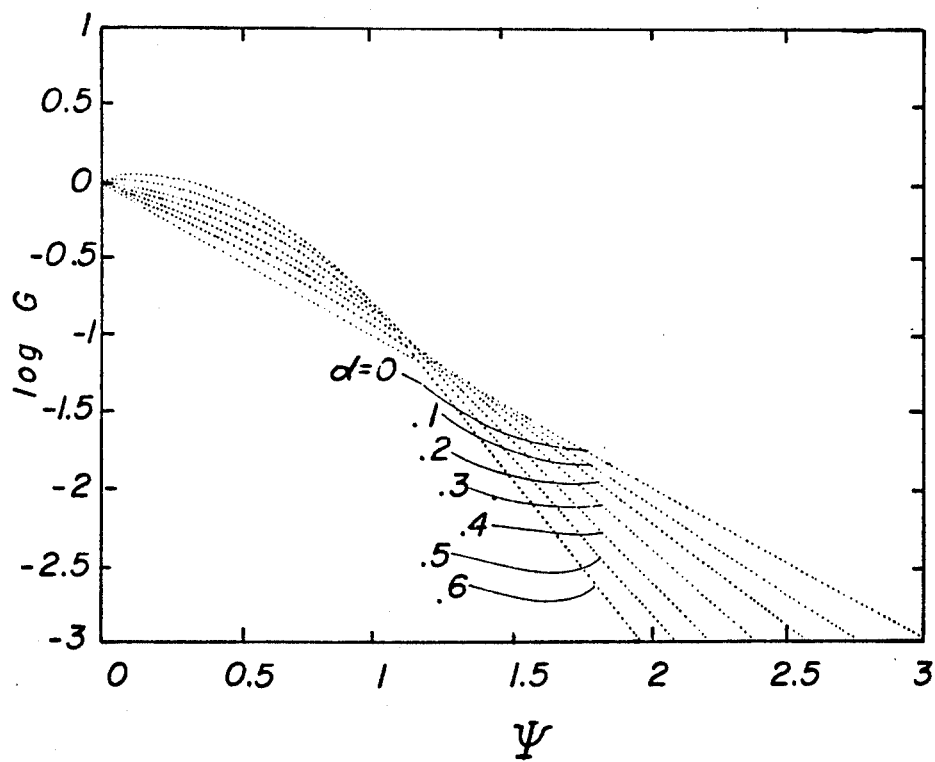
FIG. 10 is a graph similar to FIG. 9 plotting a diameter scalar against polar angle $\Psi$.
Figure 11:
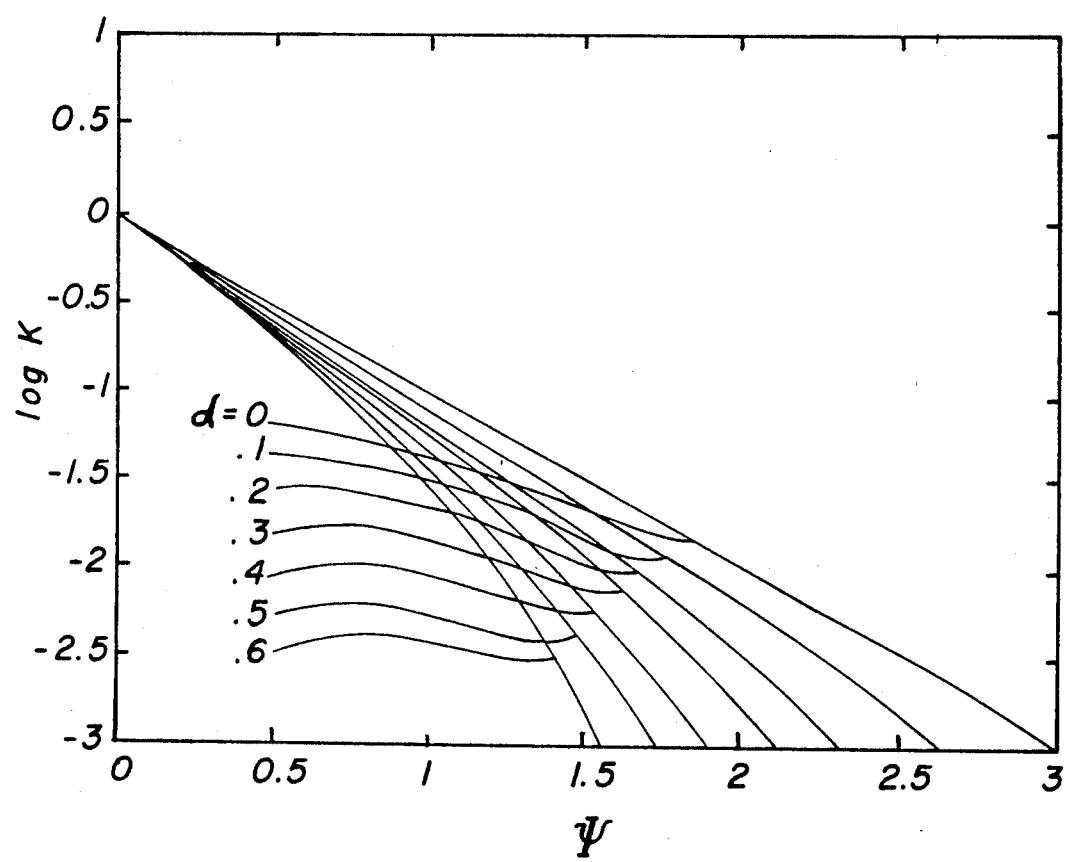
FIG. 11 is a graph plotting mean velocity as a function of polar angle, $\Psi$.

FIGS. 9, 10 and 11 show the effect of increasing values of $\alpha$ on the solution of (31, 32). For $\alpha > \frac{1}{3}$, the mean velocity decreases initially. Further, for $\alpha > \frac{1}{2}$, the retentate gap increases initially. In all cases, the gap eventually decreases asymptotically to zero while the mean velocity becomes infinitely large. In practice, the spirals will terminate at the module inner radius $r_{cT}$.

We can illustrate qualitatively the gain in surface area density achieved in the variable gap model by comparing the cross-sections as shown in FIGS. 2, 7. Clearly the variable gap model provides a significant improvement in surface area density. The following discussion shows how the gap spacers can be constructed for any given values of the parameters.

The differential for arclength 1 along the spiral is given to leading order by $$\frac{\partial l}{\partial v} = r_c.$$

Letting $$S = \frac{\rho l}{r_d}.$$

then the differential equation for S is $$\frac{\partial S}{\partial \psi} = K. \quad (48)$$

Equation (39) may be used to calculate the permeate gap width results for realistic parameter values, described below, giving close agreement with the scaling q f=d.

Figure 12:
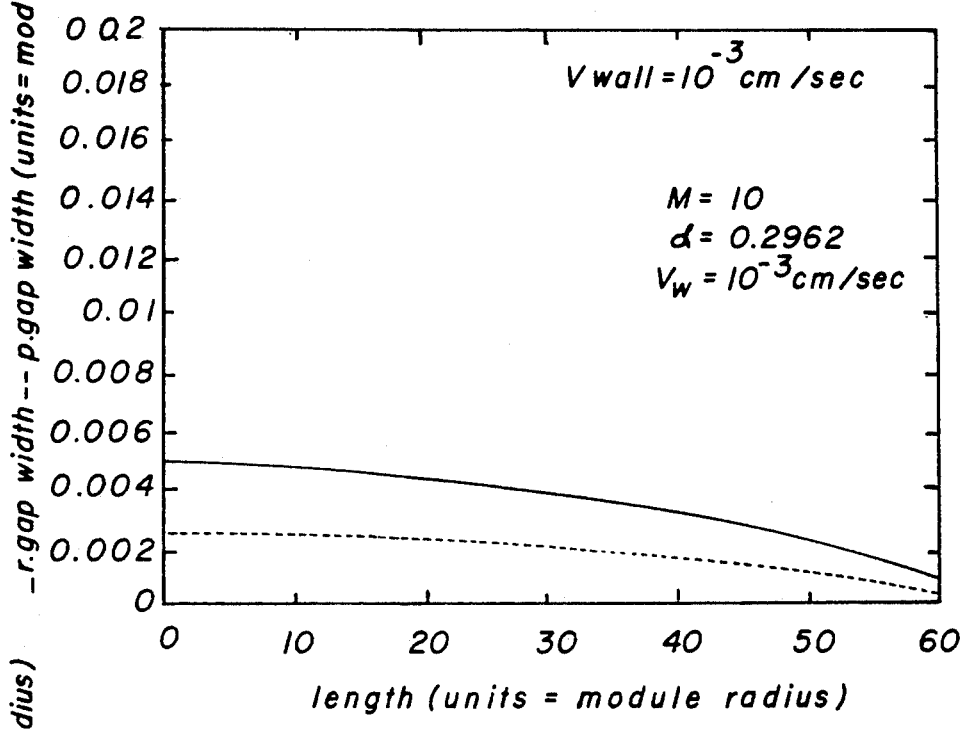
FIG. 12 is a graph plotting gap width against flow stream length, the solid line being the retentate gap and the dash line being the permeate gap.
Figure 13:
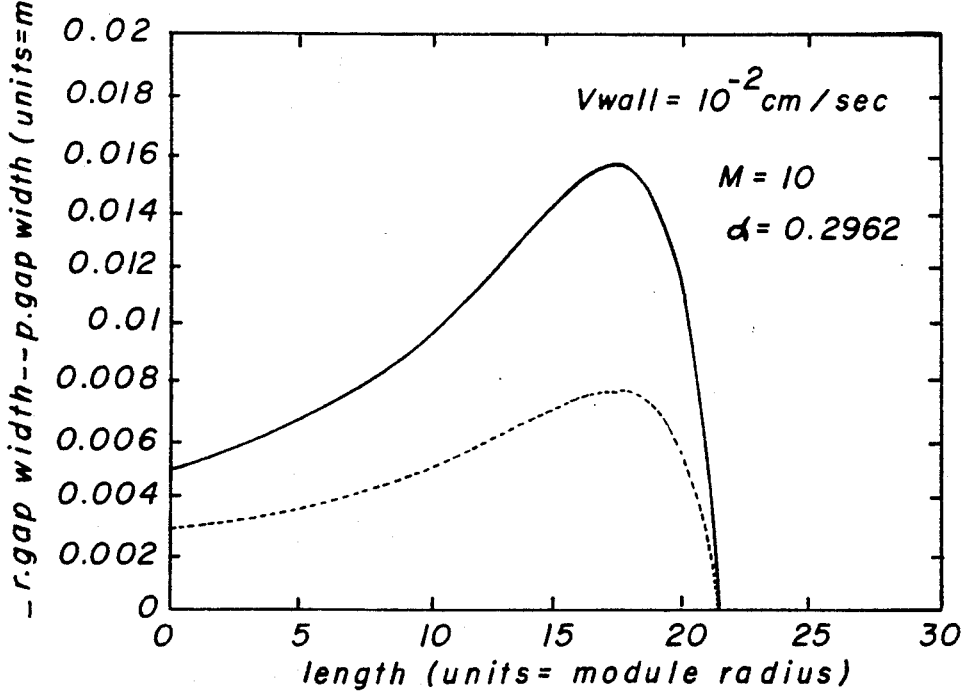
FIG. 13 is a graph similar to FIG. 12 for a different wall velocity.

In FIGS. 12 and 13, the width of the gaps are shown versus length along the spiral. The parameter values have been chosen as FIG. 12: $V_{wall} = 10^{-3}$ cm/sec.
FIG. 13: $V_{wall} = 10^{-2}$ cm/sec.
m=10, De=40, $r_{cI}=10$ cm,
$d_I=0.025$ cm, V=$10^{-2}$ cm$^2$/sec.,
$V_I=113$ cm/sec.

The retentate gap is indicated by the solid line and the permeate gap by the dashed line. The spiral may be terminated at any length. The construction of the spiral consists of a stack of m such spacers rolled up such that the termination points (outlets) stand at the correct radial distance $r_{cT}$ and have equal spacing with respect to angle about the inner radius (See, FIG. 8, 9 and 10).

Surface area densities are obtained that are equivalent to the spiral-wound module. Estimates of the pressure drops that would result with operation at the neutral stability point appear to be within reasonable limits. Computations used with the invention could be adapted to obtain an optimum design if appropriate cost/utility functions are provided.

Summarizing the algorithm for selecting the curvature of the channel in the constant gap with embodiment, the algorithm is a function of $$E = Re_{ref}, d^*, \underline{\Theta},$$

written;

$$\phi = \frac{4\sqrt{2}}{K} \epsilon \Theta,$$

$$\eta = \frac{1 + \cos\phi}{3 - \cos\phi}, \quad K = 35.94$$

$$r_i = \frac{\eta}{1 - \eta} \left( \frac{d^*}{2} \right), \quad r_o = \frac{2}{1 - \eta} \left( \frac{d^*}{2} \right).$$

This is a parameterized representation of the inner and outer wall shapes which define the spiral channel.

The symbols representing the parameters as previously defined in this disclosure. The algorithm for the variable gap embodiment is a function of $$\alpha = \frac{\pi V_{well} r_{cl}^2}{\eta V_l d_l^2}, \quad \rho = \frac{\eta d_l}{\pi r_{cl}}$$

The variable gap algorithm of the present invention can be written $$B, G \text{ satisfies } \frac{\partial B}{\partial \phi} = -3\alpha G^2 B^2 + \frac{1}{G^2 B},$$

$$\frac{\partial G}{\partial \phi} = 2\alpha G^3 B - \frac{1}{GB^2}, \quad \phi = \rho \Theta,$$

$$B(0) = G(0) = 1,$$

$B, G$ being determined numerically $K = G^3 B^2$, $r_c = K r_{cl}$, $$r_i = r_c - d_f G, \quad r_o = r_c + d_f G,$$

wherein again the symbols used designate the parameters identified previously in this disclosure.

In this disclosure, the term "fluid" is expressly intended to include both liquids and gases. Further, the term "porous" is meant to include membranes with discernable pores and membranes which include any mechanism by which mass is semi-permeably transferred through a barrier.

While specific embodiments of the invention have been shown and described in detail to illustrate the application of the principles of the invention, it will be understood that the invention may be embodied otherwise without departing from such principles.

EXAMPLE 1

Figure 14:
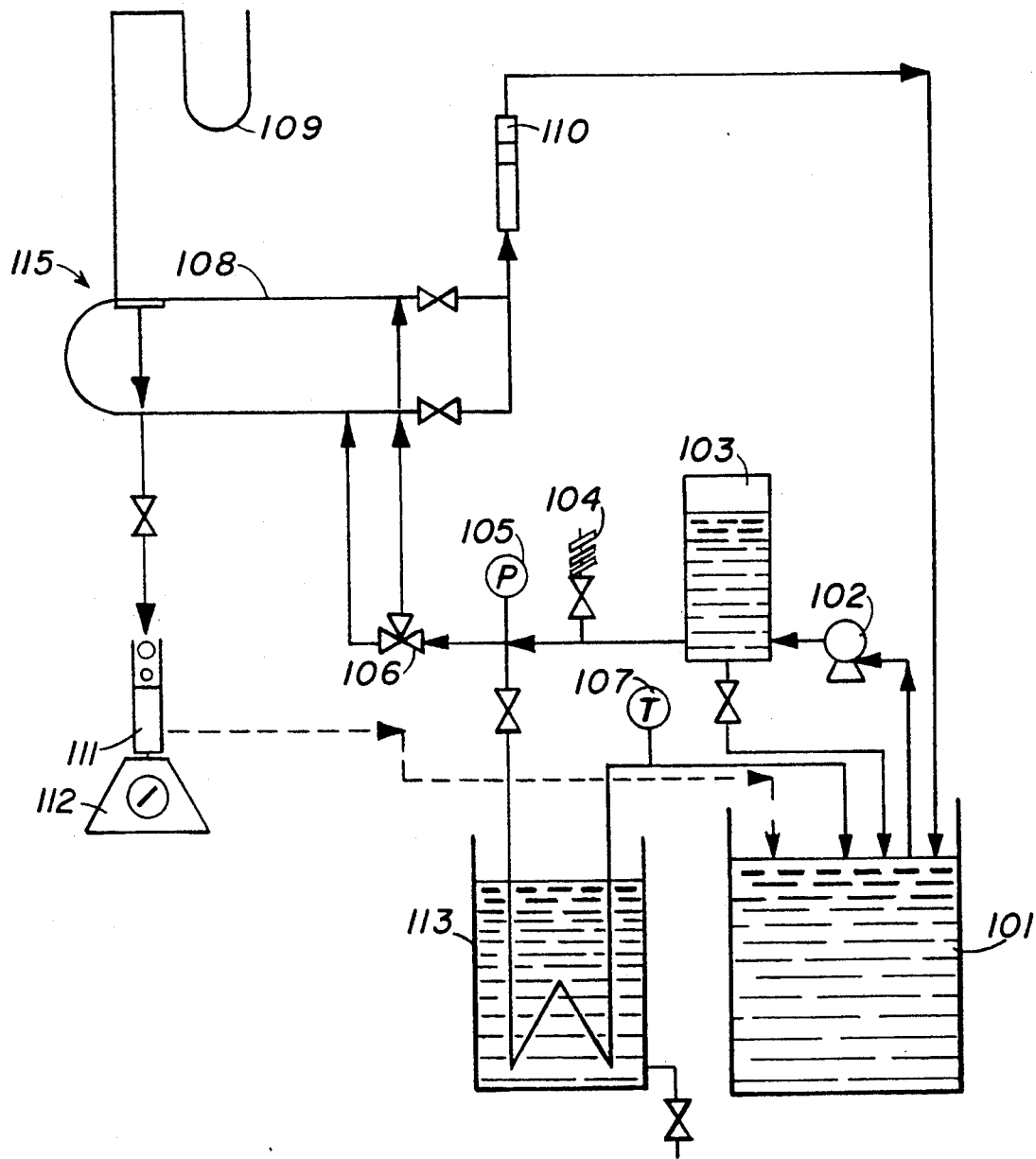
FIG. 14 is a schematic representation of a flow system used with the present invention.

A flow system is prepared as shown in FIG. 14. A narrow gap curved slit channel 115 which is detailed further below with a porous test section 108 (referred to as CSC), a 20 l reservoir 101 made of polyethylene, a duplex diaphragm pump 102 (model #75000-10, Cole-Parmer Co., Chicago, Ill.), a home-made pressure pulsation dampener 103 (2.5 l and made of a clear acrylic), a thermometer and heat exchanger 113, a rotameter 110 (model #03234-17, Cole-Parmer Col, Chicago, Ill.), a graduated cylinder 111 and mass balance 112 to estimate the permeation flow with time, a mercury-water manometer 109 and various valves. The maximum flow rate of the pump is 7 l/min at a pressure of 6.5 bar. Flow variations due to pulsations from the pump are kept to a minimum by operation the pump at its maximum flow rate and placing the flow dampener directly following the pump. Flow variations are kept to within 3% of the mean flow rate. Recycle flow to the reservoir is used to obtain the desired axial flow rate in CSC. Pressure to CSC is kept below 1.2 bar with a pressure relief valve. The largest mean axial flow rate through the CSC is about 3.33 l/min. This is equivalent to a Reynolds number 3.83 times the critical Reynolds number for the onset of vortices. The pressure gauge after the pressure relief valve is used to set the desired pressure in the CSC. Tap water with ice is used to cool the working fluid in the heat exchanger. A three-way valve before and two on-off valves after the CSC is used to reverse the flow direction in the CSC enabling comparison of permeation fluxes with and without vortices at about the same transmembrane pressure. The mercury manometer is used to set and measure the transmembrane pressure. The water manometer is used for estimating the axial pressure drop of the feed along the flow path. Fluid exiting the CSC passes through the rotameter back to the reservoir.

Figure 15:
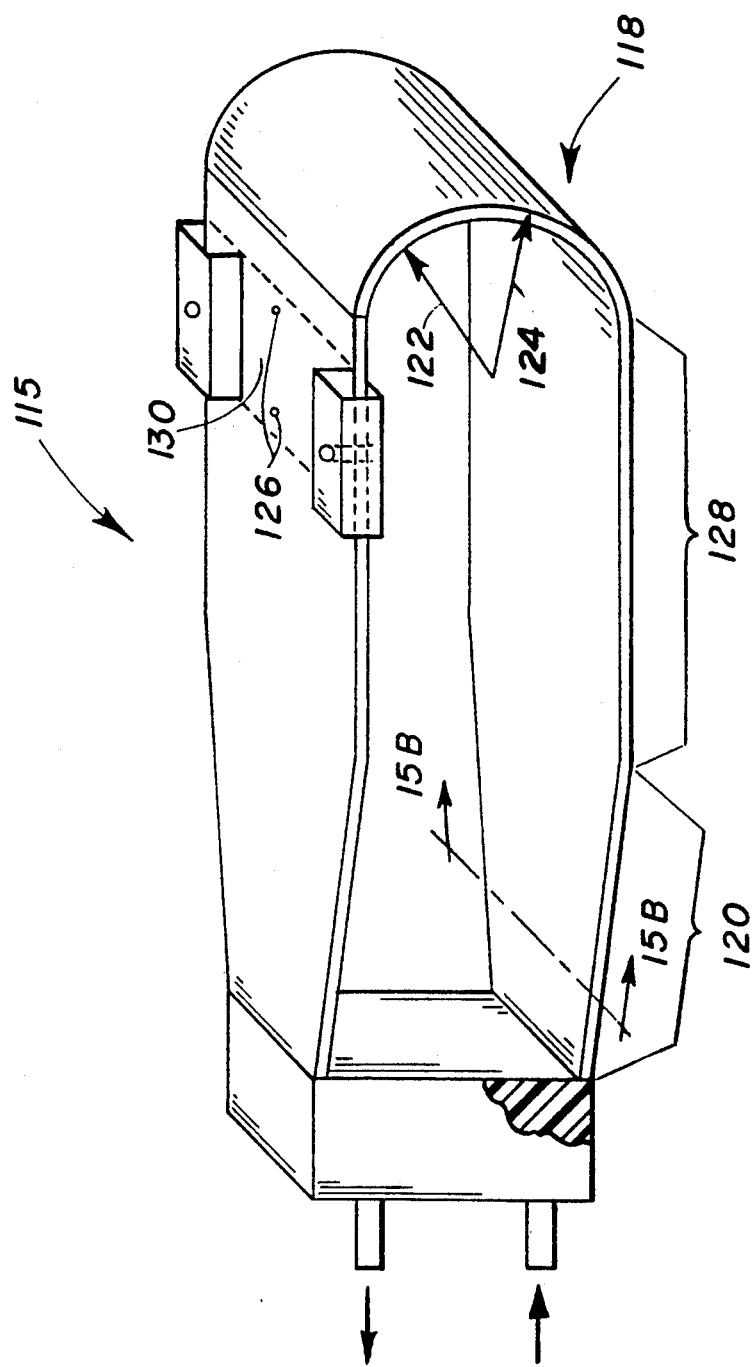
FIG. 15 is a perspective view of an apparatus according to the present invention.

Details of the transparent narrow gap curved slit channel with a porous test section are shown in FIG. 15. Dean vortices were produced as a result of curved channel flow around the 180° cylindrical curve 118 in the CSC. The following points are considered in designing the CSC.

(i) A large aspect ratio of channel width to height is provided to reduce edge effects in the flow field and to simulate a membrane flow channel. The width and the height of the cannel are 6.35 and 0.16 cm, respectively. This gives an aspect ratio of about 40.

(ii) The cross-section for flow in the entrance region of the cannel should not increase dramatically to cause separation at the walls. This feature is incorporated into the design by allowing the entrance section 20 to be gradually tapered (6.3°) in the spanwise direction (increasing the flow path).

(iii) To allow for fully developed laminar flow, a long entrance region 126 is necessary. The distance from the end of the tapered section to the curved section is 15.88 cm, or a length to height ($\frac{1}{2}$ d) ratio of about 100.

(iv) In order to compare the experimental results with predicted results from the narrow-gap theory, the ratio of the inner to the outer radii should be above 0.95. Here, the inner 122 and other radii 124 are 6.19 and 6.35 cm, respectively, yielding a radius ratio of 0.975 (FIG. 15).

The manometer connections 126 were attached to the top face of the cannel directly above the membrane test section 30 in order to obtain an accurate reading of the feed pressure (FIG. 15).

Previous, but undisclosed, experiments showed that Dean vortices formed during flow around a curved 180° solid-walled channel, remained stable for long distance (i.e. at least for dimensional axial distances of $\frac{1}{2}$ d) within the flat section that followed the curved section 132. This finding suggests the possibility that (i) new modules could be designed with curved entrances (to produce vortices) and flat sections (to maximize packing considerations and reduce complexity), and (ii) a permeable test section need not be placed on the curved section but may be placed a short distance after it in the flat section, substantially simplifying the design. The membranes (6.35 by 7.62 cm) are placed onto a removable and sealable porous test section and inserted into the lower face of the channel from the bottom. The membrane (glued to the support insert with silicone rubber, Silicone II, General Electric Co., Waterford, N.Y.) and O-ring sealed the system. Outer support clamps are used to pressure the insert into the channel and seal the fluid within the system. The membrane surface is aligned with the channel lower surface such that the fluid does not experience any changes in the channel height. Permeate is collected and weighed on a mass balance.

The CSC was constructed of transparent acrylic "plexiglass" so that the cortices could be visualized with addition of materials that would enhance their resolution. Two types of additive were used: a standard blue ink (1-2 cm³, Skrip Ink, Shaeffer Eaton, Pittsfield, Mass.) and a combination of aluminum powder (Aluminum find powder, Merck #1056, Merck AG: 0.05~0.1 wt %) and blue indigo dye (sodium indogo-disulfonate, Eastman Kodak, Rochester, N.Y.; 0.05~0.1 wt %).

Dense ink stripes equally spaced (of about 2d width) indicated the interfaces between the Dean vortices. The blue indigo was used to limit the transparency of the fluid and allow one to see the reflected aluminum particles moving along fluid streamlines.

The onset and presence of vortices were visualized by adding blue ink dye and a combination of aluminum powder and blue indigo dye. After setting the desired flow rate and transmembrane pressure, blue ink dye was injected just prior to the CSC. In a second set of visulization experiments, blue aluminum powder was dispersed in the carrier fluid. As more and more blue indigo dye was added, light reflection of the suspended aluminum particles became more visible, especially near the "plexiglass" surface, thus high-lighting the flow streamlines. These measurements confirmed not only the existence of Dean vortices but also their location near the membrane surface.

EXAMPLE 2

Because the pressure limitations in the CSC and time limitations to obtain a noticeable change in the permeation fluxes, high microfiltration membranes of polysulfone are used (Mode numbers GRMO.2PP, Dow Danske, Nakskov, Denmark). The nominal pore size of the membranes is 0.2 and 2.0 $\mu$m. The drain channel or porous support for the membrane consists of two sheets of simplex knit fabric (polyester fiber) stiffened with epoxy coating (FilmTec Corp., Minneapolis, Minn.).

Three different feed solutions are suspensions are used to determine the effectiveness of Dean instabilities to destabilize polarization layers. They include DI water as a control, monodispersed polystyrene latex particles and a yeast suspension. Each of these feeds are described in more detail below.

A first feed solution of DI water is prepared by passing Troy city tap water through a reverse osmosis module (FT30, Film Corp., Minneapolis, Minn.), a mixed strong ion exchange bed, and a UV unit. This gives essentially organic-free 19 megohm water. Prior to use, this water is passed through a 100 kD MWCO polysulfone membrane to remove any unexpected particles or cells. A second feed solution of monodispersed particles with a diameter of 11.9$\pm$1.9 $\mu$m and a density of 1052 kg/m$^3$, prepared by suspension polymerization of styrene-divinyl-benzene is used as a suspension at a concentration of 0.15 wt % in DI water. The third feed comprised of a commerical baker's yeast (Saccharomyces cerevisiae) at a concentration of about 0.3 wt % in DI water. The cells are larger than about 3–5 $\mu$m in diameters.

After setting the desired flow rate and transmembrane pressure, the mass balance was switched on with the graduated cylinder placed on it. The permeate valve was then opened and the stop-watch started. Permeated volume with the time was recorded to obtain a time-dependent permeate flux (the surface area of active membrane was 4.84E-3 m$^2$). Although, in principle, true steady state operation could not be reached for the suspension feeds, since a very small fraction of the solids were irreversible deposited onto the membrane surface, pseudo-steady state could be assumed i.e. the membrane "sees" approximately the same feed solution through out the experiment. This is possible since the changes although real were very small because of the large volume of the feed reservoir (4 l working fluid), small transport area of the membrane and hence relatively small permeate volume collected (maximum 100 ml), and short test period (about 100 min.).

For each run of the example the flow direction in the CSC was such that vortices could be produced over the membrane as the flow first passed through the 180° bend and then over the porous test section. Then, without switching off the pump, the flow direction in the CSC was reversed such that the fluid passed over the porous test section before passing through the curved section. Once again the flow was reversed to the original direction to confirm the effect of the presence of the vortices on flux. By keeping the axial flow rate and transmembrane pressure approximately the same for each flow direction, we were able to compare the effectiveness of the presence and absence of vortices to depolarize the solution from the membrane.

Monodispersed polystrene latex particles and reconstituted yeast cells are suspended in DI water and tested in the CSC. The fluxes are compared to those with DI water alone as a control. For each suspension the flux data are compared as a function of time for flow conditions with and without Dean vortices, for the two different microfiltration membranes (0.2 and 2.0 $\mu$m) and at three axial flow rates. The results are shown in FIGS. 16–19.

Figure 16:
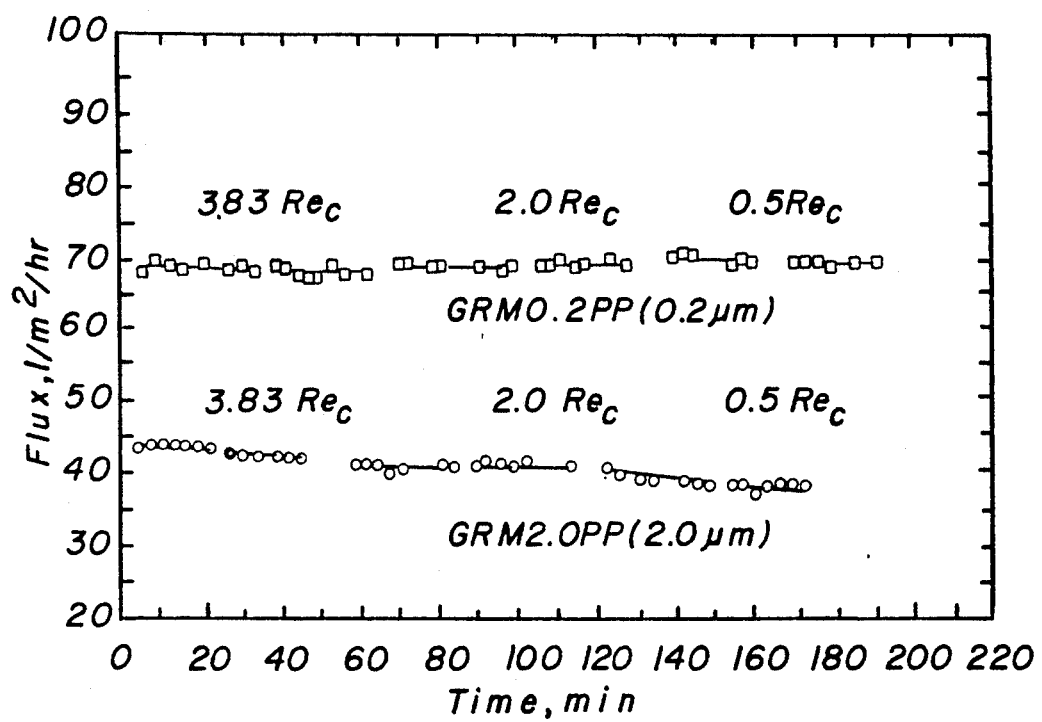
FIG. 16 is a graph plotting flux against time for membranes with and without the use of vortices.

For the DI water the fluxes values are essentially indifferent to the presence of absence of Dean vortices or the axial flow rate (FIG. 16). This is expected since there is no solute build-up at the membrane-solution interface and hence no polarization or fouling. The result also shows that the membranes behave similarly no matter the direction or intensity of the flow. Forward flow (with vortices) is indicated by open circles or open boxes. Backward flow (without vortices) is indicated by filled circles or boxes. The membrane pore size are as indicated on FIG. 16. Axial flow rates 0.43, 1.74 and 3.33 l/min. correspond to 0.4, 2.0 and 3.83 times Re$_c$, respectively. Transmembrane pressure is constant at 75.2 KPa (10.9 psi).

Figure 17A:
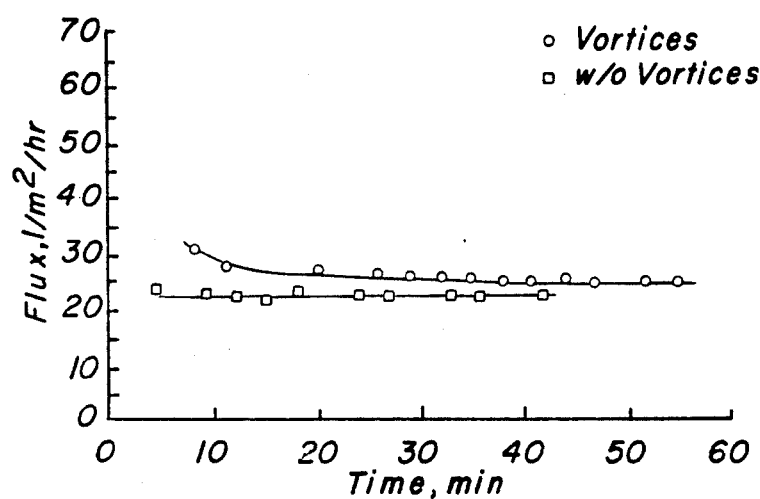
FIG. 17 is a composite set of graphs each plotting flux against time for membrane with and without vortices.
Figure 17B:
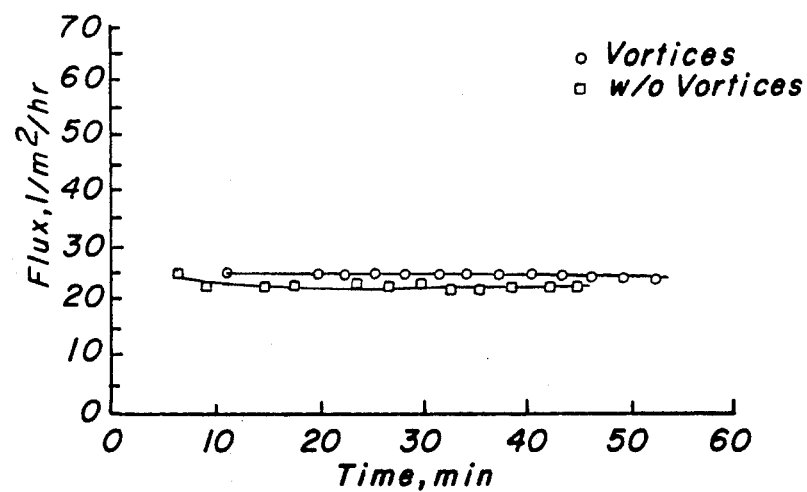
Figure 17C:
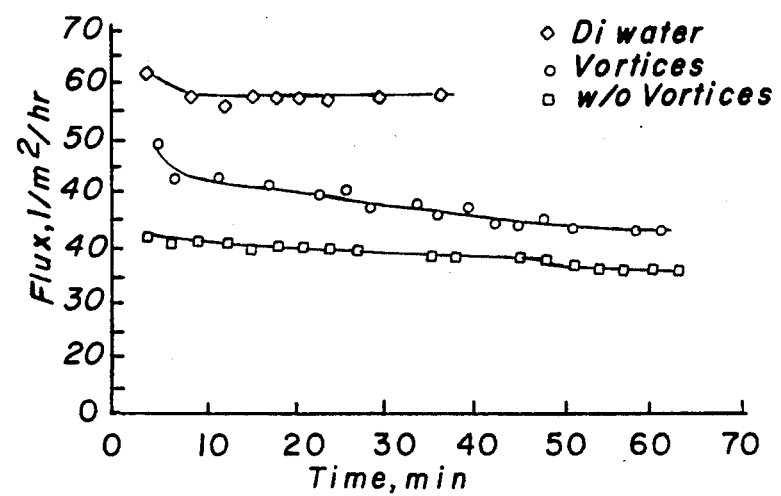

For the 0.15 wt % suspension of 11.9 $\mu$m styrene-dinvinyl-benzene particles as feed, the beneficial effects of Dean vortices on the permeation flux of a 2.0 $\mu$m pore size membrane is seen in FIG. 17. In FIG. 17, graph (a) shows the flux of forward and backward flow at an axial flow rate of 0.43 l/min. corresponding to 0.5 times Re$_c$. Graph (b) shows the flux of forward and backward flow at an axial flow rate of 1.74 l/min. corresponding to 2.0 times Re$_c$. Graph (c) shows the flux of forward and backward flow at an axial flow rate of 3.33 l/min. corresponding to 3.83 time Rec. Transmembrane pressure is constant at 75.2 KPa. Pumping the fluid through the CSC at low flow rate (0.5 Re$_c$) the flux is independent of flow direction. However, a small yet perceptible improvement (9%) is observed in the presence of weak vortices at 2.0 Re$_c$, while for stronger vortices (3.83 Re$_c$) the improvement is even greater (26%).

Figure 18A:
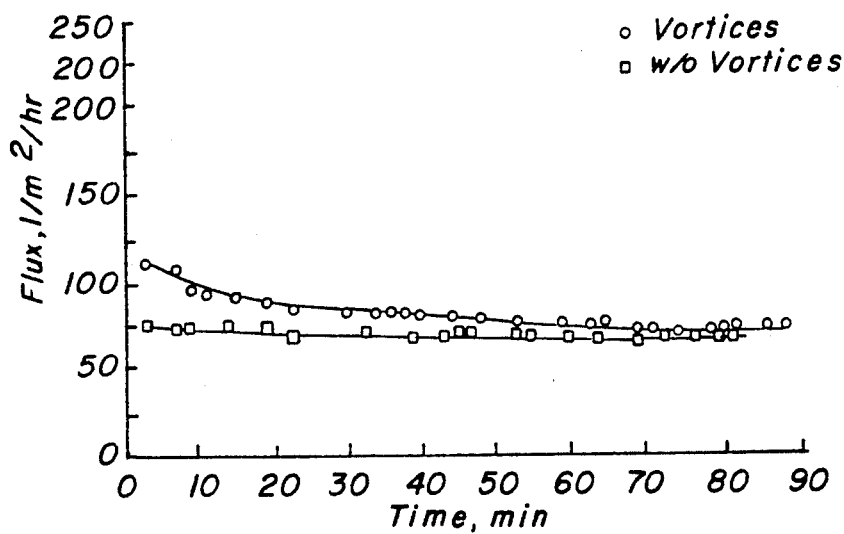
FIG. 18 is a set of graphs plotting flux against time for membranes with and without vortices.
Figure 18B:
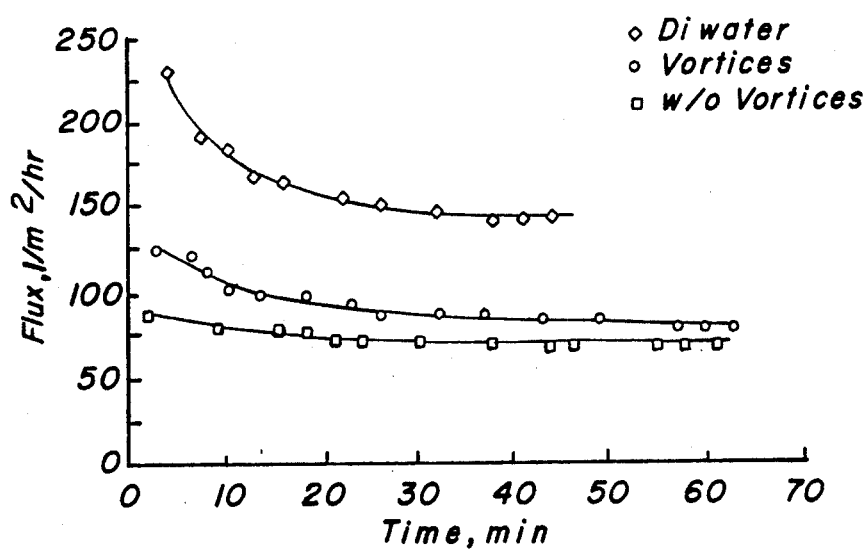

Similar results, although smaller, are seen in FIG. 18 for the 0.2 m microfiltration membrane. In FIG. 18 graph (a) shows the flux of forward and backward flow fr the 0.2 $\mu$m pore size membrane for the same feed as illustrated by FIG. 17. Graph (a) shows the flux for axial flow rates of 1.74 l/min. corresponding to 2.0 times Re$_c$. Graph (b) shows the flux for axial flow rates of 3.33 l/min. corresponding to 3.83 times Re$_c$.

Figure 19A:
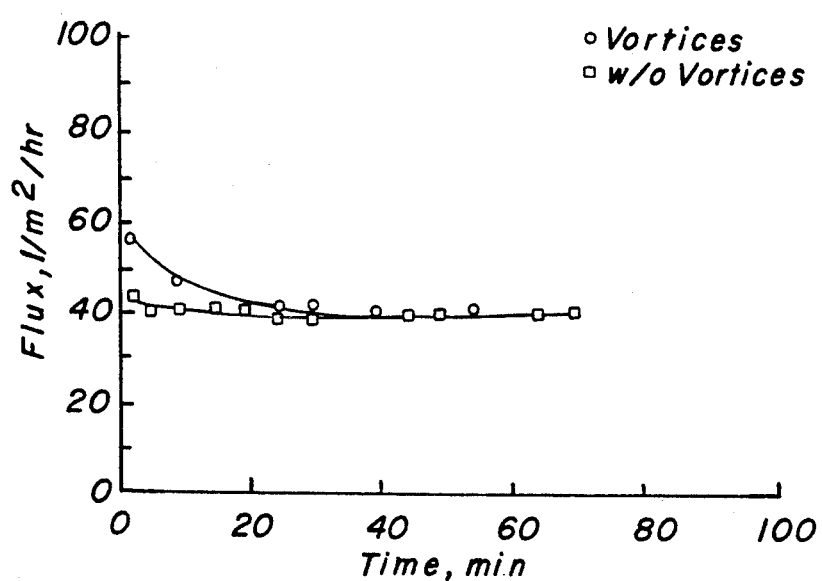
FIG. 19 is a view similar to FIG. 18.
Figure 19B:
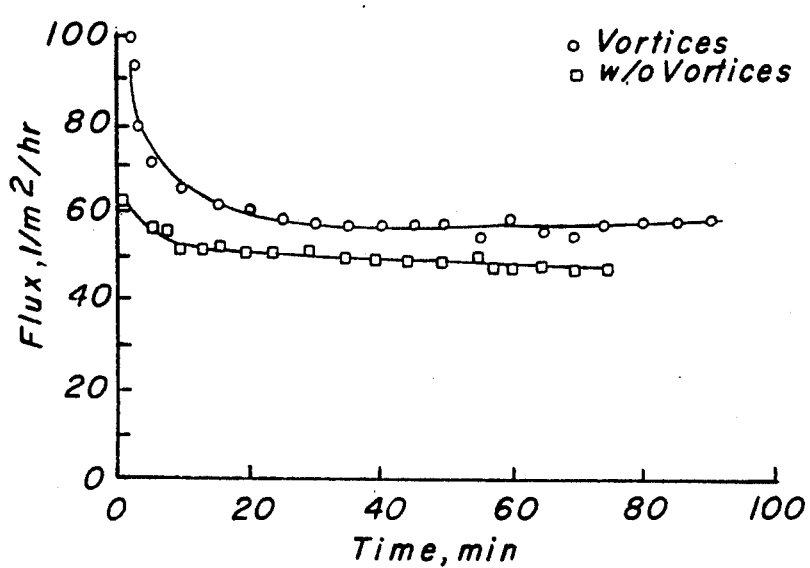

For a 0.3 wt % suspension of reconstituted yeast cells as feed, the beneficial effects of Dean vortices on the permeation flux is seen in FIG. 19. FIG. 19 concerns a 0.2 m pore size membrane with a suspension of reconstituted yeast cells 0.3 wt. %. Forward and backward flow is shown. Graph (a) shows the flux for axial flow rates 1.74 l/min. corresponding to 2.0 times Re$_c$. Graph (b) shows the flux for axial flow rate 3.33 l/min. corresponding to 3.83 times Re$_c$. Pressure is constant at 74.5 KPa. Pumping the fluid through the CSC at intermediate flow rates (2.0 Re$_c$) shows hardly any advantage. However, with faster flow rates, the advantage of having stronger vortices (3.83 Re$_c$) versus no vortices is clear (30% improvement).

What is claimed is:

1. A filtration apparatus for separating at least one substance of a fluid, from another substance of the fluid, comprising:
    an inner wall which is curved around an axis of curvature;
    an outer wall which is curved around the axis of curvature, at least one of the inner and outer wall being of material that is porous to the one substance, the outer wall being spaced outwardly of the inner wall by a gap defining a curved channel having a fluid inlet for receiving a flow of the fluid and a fluid outlet for discharging the flow of fluid, the gap of the channel being narrow compared to a width of the channel along the axis; and
    means for creating and maintaining Dean vortices in the channel including a curvature and gap which is defined by the curvature of said inner and outer walls.

2. An apparatus according to claim 1, wherein the channel is open and free of obstructions.

3. An apparatus according to claim 2, wherein the channel curves in a spiral fashion from an outer periphery to an inner end, the fluid inlet being at the outer periphery of the spiral and the fluid outlet being at the inner end of the spiral channel.

4. An apparatus according to claim 3, wherein the curvature of the channel increases from the outer fluid inlet to the inner fluid outlet of the channel.

5. An apparatus according to claim 4, wherein the inner and outer walls each have a radius of curvature that changes from the fluid inlet to the fluid outlet of the channel, the radius of the inner wall divided by the radius of the outer wall comprising a radius ratio, the curvature of the channel being defined by a radius ratio of from 0.9 to 0.995.

6. An apparatus according to claim 3, wherein the shape of the channel is defined by the algorithm:

where $$\phi = \frac{4\sqrt{2}}{K} \epsilon \Theta,$$

$$\eta = \frac{1 + \cos\phi}{3 - \cos\phi},$$

$$r_i = \frac{\eta}{1 - \eta}\left(\frac{d^*}{2}\right), r_o = \frac{2}{1 - \eta}\left(\frac{d^*}{2}\right).$$

$\epsilon = \text{Re}_{ref}$
$d^* = $ channel gap space
$\Theta = $ polar angle
$r_i = $ inner radius
$r_o = $ outer radius
$\eta = $ radius velocity.

7. An apparatus according to claim 1, wherein the curvature of the inner and outer walls is selected to vary the gap of the channel along the curvature of the channel to create and maintain Dean vortices in the flow of the fluid along the channel.

8. An apparatus according to claim 7, wherein the gap varies from the fluid inlet to the fluid outlet of the channel, the channel being spirally wound with the fluid inlet being on an outer periphery of the spiral and the fluid outlet being on an inner end of the spiral.

9. An apparatus according to claim 7, wherein the channel shape is defined by the algorithm, where B, G satisfies:

$$\frac{\partial B}{\partial \phi} = -3\alpha G^2 B^2 + \frac{1}{G^2 B}, \frac{\partial G}{\partial \phi}, = 2\alpha G^3 B \frac{1}{GB^2},$$

$B(0) = G(0) = 1$, $B,G$ being determined numerically, $K = G^3 B^2$, $r_c = Kr_{cl}$, $r_i = r_c - d_f G$, $r_o = r_c + d_f G$, where $$\phi = \rho \Theta$$

$$\alpha = \frac{TY V_{wall} r_{cl}^2}{\eta V_f d_f^2}, \rho = \frac{\eta d_f}{\pi r_{cl}}$$

10. A filtration method for separating at least one substance of a fluid from another substance of the fluid, comprising:
    passing the fluid at a fluid flow rate through a curved channel having inner and outer walls, at least one of which being porous to the one substance;
    the channel having an axis of curvature and having a narrow radial gap with respect to the axis and as compared to an axial width of the channel along the axis; and
    providing means for creating and maintaining Dean vortices within the flow of fluid in the channel by providing a preselected curvature in the channel.

11. A method according to claim 10, wherein the channel is curved into a spiral shape, fluid being inlet into the channel at an outer periphery of the spiral and removed from the channel at an inner end of the spiral, the curvature of the channel increasing from the outer periphery to the inner end of the channel.

12. A filtration method for separating at least one substance of a fluid from another substance of the fluid, comprising:
    passing the fluid at a fluid flow rate through a curved channel having inner and outer walls, at least one of which being porous to the one substance;
    the channel having an axis of curvature and having a narrow radial gap with respect to the axis and as compared to an axial width of the channel along the axis; and
    creating and maintaining Dean vortices within the flow of fluid in the channel by varying the radical gap along the channel within preselected limits.

13. A filtration apparatus for separating at least one substance of a fluid, from another substance of the fluid, comprising:
    means for creating and maintaining Dean vortices and for causing the fluid flow to continue into a region of the flow channel wherein Dean vortices are no longer established, but Dean vortices, previously established in the flowing fluid are not fully dissipated and the flowing fluid contacts a membrane which is permeable to at least one substance of the fluid, including a curved fluid flow channel which is narrow in a direction radial to the axis of curvature, broad parallel to the axis of curvature.

14. The filtration apparatus of claim 13 wherein the apparatus is a plate and frame device.

15. The filtration apparatus of claim 13 wherein the membrane is a reverse osmosis membrane, nanofiltration membrane, ultrafiltration membrane, or a microfiltration membrane.

* * * * *